United States Patent
Gallagher et al.

(10) Patent No.: US 8,904,408 B1
(45) Date of Patent: Dec. 2, 2014

(54) PRE-FETCHING DATA AND OVERLAPPING DATA TRANSFERS IN A HWA-DWA SYSTEM

(75) Inventors: Timothy Leo Gallagher, Encinitas, CA (US); Joseph William Long, Oceanside, CA (US)

(73) Assignee: Intel Corporation, Santa Clara, CA (US)

( * ) Notice: Subject to any disclaimer, the term of this patent is extended or adjusted under 35 U.S.C. 154(b) by 1641 days.

(21) Appl. No.: 12/077,527

(22) Filed: Mar. 17, 2008

Related U.S. Application Data (60) Provisional application No. 60/918,439, filed on Mar. 15, 2007.

(51) Int. Cl.
*G06F 9/54* (2006.01)

(52) U.S. Cl.
USPC ............................. 719/314; 710/21; 710/35

(58) Field of Classification Search
CPC ... G06F 11/3013; G06F 11/3051; G06F 9/50; H04L 25/0272; H04L 12/585; H04N 21/42646
See application file for complete search history.

(56) References Cited

U.S. PATENT DOCUMENTS

| | | | | |
|---|---|---|---|---|
| 6,842,797 | B1* | 1/2005 | Lawande | 710/35 |
| 2005/0283634 | A1* | 12/2005 | Rai | 713/600 |
| 2007/0038784 | A1* | 2/2007 | Sung et al. | 710/56 |
| 2007/0233922 | A1* | 10/2007 | Ismail et al. | 710/112 |

* cited by examiner

*Primary Examiner* — Tuan Dao
*Assistant Examiner* — Syed Roni
(74) *Attorney, Agent, or Firm* — Schwegman Lundberg & Woessner, P.A.

(57) ABSTRACT

Data is managed in a Host Wireless Adapater (HWA)-Device Wireless Adapater (DWA) system by receiving at the HWA a wireless packet from the DWA which contains a DWA Transfer Result message. At the HWA, the DWA Transfer Result message is parsed. In the event parsing the DWA Transfer Result message indicates there is data ready to be sent over a wireless channel between the HWA to the DWA a Micro-scheduled Management Command (MMC) is generating at the HWA and the MMC is transmitted from the HWA to the DWA. The MMC is transmitted prior to receiving a Transfer Request message at the HWA from an HWA driver and the data is transmitted from the DWA to the HWA in response to receiving the MMC.

15 Claims, 7 Drawing Sheets

PRE-FETCHING DATA AND OVERLAPPING DATA TRANSFERS IN A HWA-DWA SYSTEM

CROSS REFERENCE TO OTHER APPLICATIONS

This application claims priority to U.S. Provisional Patent Application No. 60/918,439 entitled HWA-DWA PERFORMANCE IMPROVEMENTS filed Mar. 15, 2007 which is incorporated herein by reference for all purposes.

BACKGROUND OF THE INVENTION

Device Wireless Adapters (DWA) and Host Wireless Adapters (HWA) are used to provide wireless capabilities for Universal Serial Bus (USB) devices and hosts respectively which were not originally designed to support wireless. For example, a DWA is inserted into a USB port or connector of a USB device (i.e., slave side) and information is exchanged using a wireless transceiver included in the DWA. It would be desirable if techniques to improve the performance of systems that use HWAs and/or DWA were developed. In one example HWA-DWA system, the USB host is a computer and the USB device is a printer and performance improvements to the system would permit large documents to be printed faster.

The Wireless USB specification requires compliant HWA and DWA devices to implement the concept of a 'Remote Pipe' (RPIPE). An RPIPE is basically a configurable buffer used to hold outgoing and incoming data while the wireless-link protocol ensures all the data has been successfully sent to the other side. Standard messages are defined to control the flow of data into and out of the RPIPEs. In a typical implementation, a 'device driver' (i.e., a software program running on the host side) will send the required messages. In the specification, each transfer of an RPIPE is accomplished by 4 messages: (1) Transfer Request, (2) Transfer Notification, (3) Transfer Result and (4) Data. For example, if a PC (or some other USB host) wants to get 16 Kbytes from a remote device connected to a DWA, it will send a transfer request to tell the DWA to fill an RPIPE (previously configured to deal with data to be sent to the host—referred to as IN data). The DWA will attempt to do so, and when it has completed (either successfully or not) it will send a Transfer Notification message. This will trigger the device driver to request the Transfer Result—which tells the driver the results of the attempt to fill the RPIPE (e.g., how much data was fetched, etc). After the Transfer Result, the device driver will fetch the data stored in the RPIPE. The specification also allows an RPIPE buffer space to be split among several concurrent (or overlapping in-time) transfers to reduce the overhead associated with the 4-message protocol. It would be useful to develop techniques that improve data transfer throughput while still complying to the Wireless USB specification.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Two techniques to improve the performance of a HWA/DWA system are disclosed herein. The first technique is to enable and HWA to pre-fetch the data-phase of an IN transfer. For example, an HWA receives over the air from a DWA a data packet containing the DWA transfer result which is sent up to a DWA driver. For a traditional HWA, this packet is just data; the HWA does not know or understand anything about DWA transfers (or other processes from a higher level understanding). It can parse the DWA transfer result, anticipate what the DWA driver and HWA driver will do next (which in this example will be to fetch the data associated with the Transfer Result (TRes)), and prefetch the data. In the second technique, an HWA driver is configured to inform a DWA driver at least one overlapping transfer has completed and there is space in a DWA RPIPE so the DWA driver can start a next transfer earlier than could be started otherwise. Traditionally, in some embodiments, only one of these improvements is used. In some embodiments, both improvements are used.

Figure 1:
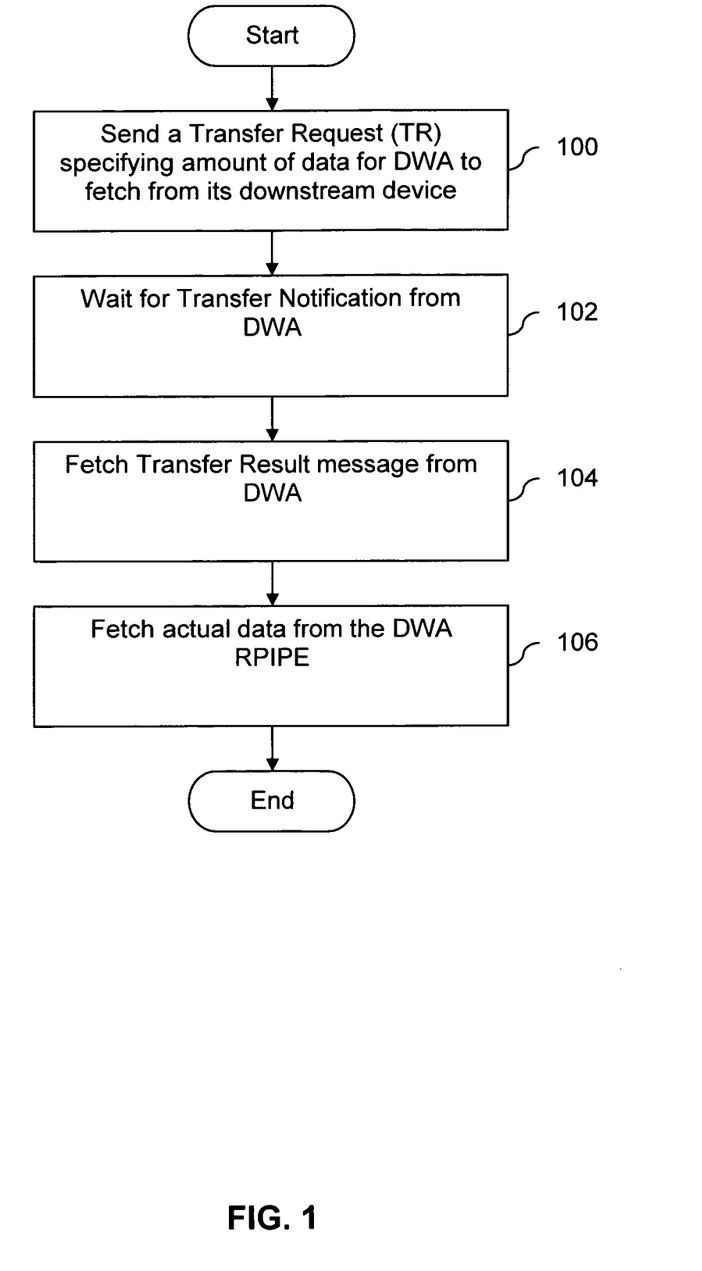
FIG. 1 is a flowchart illustrating an example of an IN transfer.

FIG. 1 is a flowchart illustrating an example of an IN transfer. An IN transfer is associated with a 4-message protocol specified in the Wireless USB specification. The example IN transfer process shown is performed by (i.e., is from the point of view of) a device driver. In the example shown, the device driver performing the process is a DWA driver.

At 100, a Transfer Request (TR) is sent specifying amount of data for DWA to fetch from its downstream device. For example, this may be sent to a BULK OUT endpoint of a DWA. At 102, there is a wait for a Transfer Notification from a DWA. In some embodiments this means polling a DWA's INTERRUPT IN endpoint until a Transfer Notification occurs. The Transfer Notification informs the driver that the DWA has completed its attempt to fetch data from the downstream device. In some embodiments, a Transfer Notification does not tell the driver the results of the attempt; in such embodiments this is included in a subsequent message. A Transfer Result message is fetched from a DWA at 104. In some embodiments, this message tells a driver how much data the DWA actually was able to fetch (and therefore how much data resides in the DWA RPIPE). This message may be sent on the DWA's BULK IN endpoint. At 106, actual data from a DWA RPIPE is fetched. In one example, the data is sent on the BULK IN endpoint; the protocol distinguishes between the Transfer Result message and the actual data by strict ordering of the two message types. A Transfer Result must always be followed by a Data message; there can never be two Transfer Results in a row or two Data messages in a row.

The period or phase after a Transfer Request message is exchanged (e.g., step 100) and prior to a Transfer Notification message (e.g., step 102) is referred to as a Transfer Request period. The period of time between a Transfer Notification message occurs and a Transfer Result message occurs (e.g., step 104) is referred to as a Transfer Notification period. The period of time between a Transfer Result message and fetching data from a DWA RPIPE (step 106) is referred to as the Transfer Result period. The period of time occurring when data is fetched from the DWA RPIPE is referred to as the Data Fetch period. As will be described in further detail below, support for parallel (i.e., overlapping) data transfers is provided and one data transfer may be in one phase while another data transfer is in the same or another phase.

The simplest implementation uses a separate transaction group for each of the four messages, so the WUSB host must create a Micro-scheduled Management Command (MMC) for each message. An MMC is a control packet sent over the air to all WUSB devices that tells them when to receive and transmit data and which endpoints the data is targeted toward. When a DWA and HWA are used, each of the four DWA messages is sent as a transfer to the HWA. Therefore, each DWA message will create a four message HWA exchange. Messages between the HWA and the HWA driver do not go over the air, and so usually can complete faster than DWA messages.

In some embodiments, an optimization is implemented which takes advantage of the fact that the Transfer Notification (TN) message provides little added information. In some embodiments, to be compliant with the specification a driver asks for the TN, but ignores it and does not wait for the TN before asking for the Transfer Result (TRes). As a result of this optimization, it is possible for a TN and TRes to share a transaction group.

The system throughput depends on the total time required to complete each four message transfer, so it is desirable to minimize the time spent on each message. However, the description in chapter 8 of the WUSB specification implies that the management of the four message sequence is done by the driver. This imposes some extra overhead. For example consider the time between the TRes and the data fetch shown in FIG. 2 below.

Figure 2:
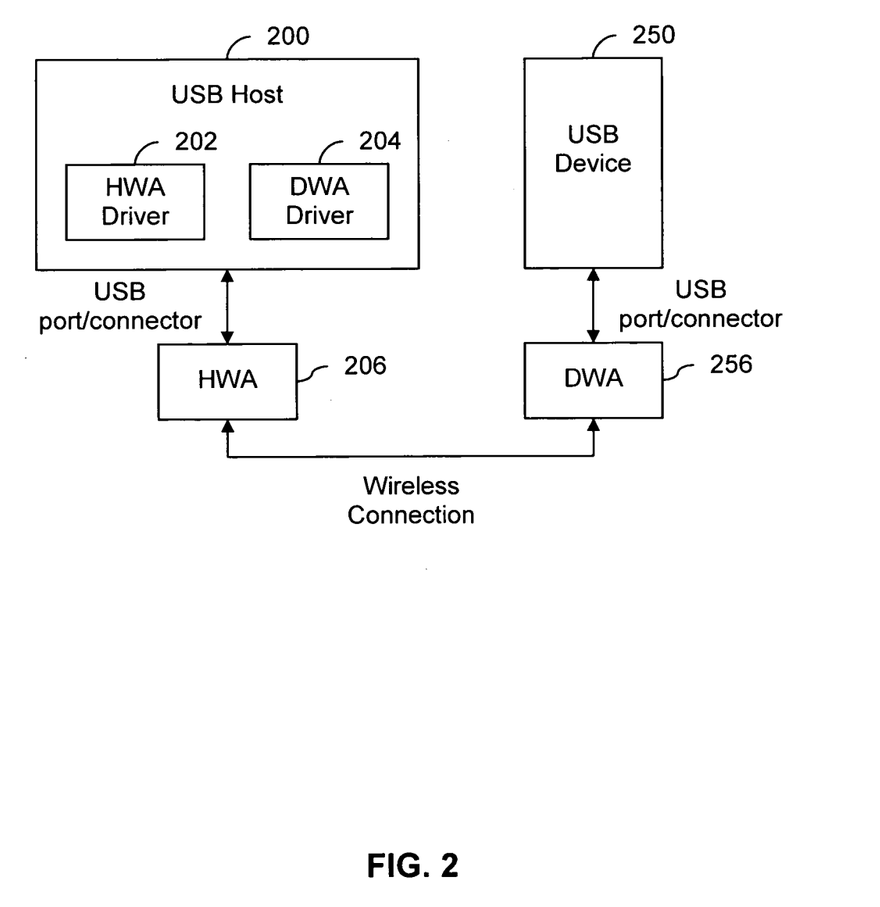
FIG. 2 is a diagram illustrating an example of a DWA-HWA system.

FIG. 2 is a diagram illustrating an example of a DWA-HWA system. In the example shown, USB host 200 and USB device 250 are legacy devices, meaning that they do not have built-in wireless capabilities. DWA driver 204 resides on Host 200 and communicates with DWA 256 over the air. This is one of the reasons the four message handshake is so slow. HWA 206 and HWA driver 202 communicate over a wired connection and is therefore faster than the connection between DWA driver 204 and DWA 256. In one example, USB host 200 is a personal computer and DWA and HWA drivers 202 and 204 are programs running on the PC. Oftentimes, USB device 250 has very little software 'smarts'.

Figure 3A:
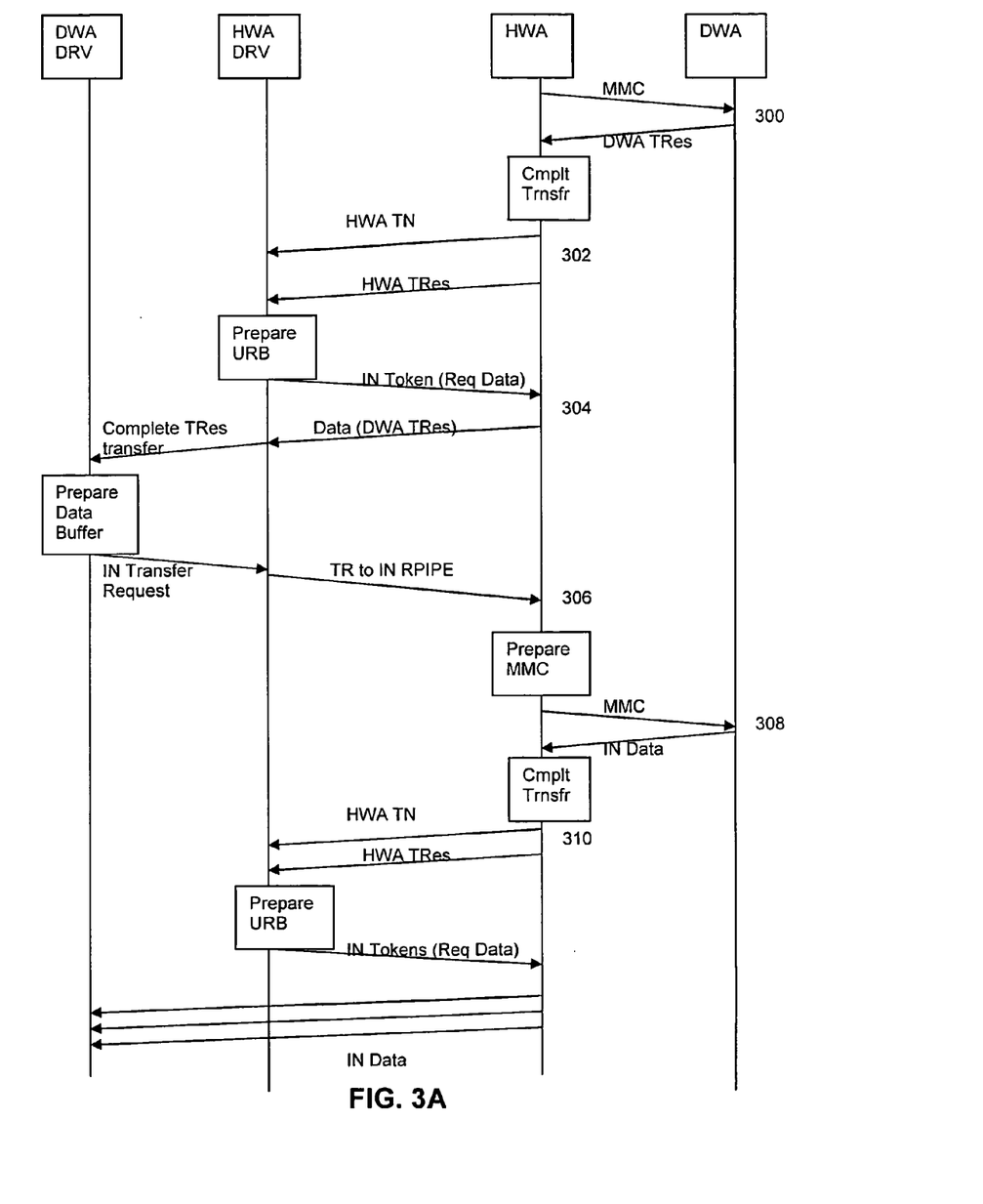
FIG. 3A is a diagram illustrating an example of part of a four message transfer.

FIG. 3A is a diagram illustrating an example of part of a four message transfer. In the example shown, a Transfer Result message and a Data message are shown. In the example shown, information is exchanged between DWA driver, HWA driver, DWA, and HWA. At time 300, the HWA sends an MMC to request a TRes message. When it arrives, the HWA must realize that the HWA transfer to get the TRes message has completed—and therefore must send to the driver a TN, (HWA) TRes and payload (which is the DWA TRes). Depending on the implementation, this transfer completion process can take on the order of 50-150 microseconds.

When the device driver for the HWA gets the HWA TRes message, it must send a USB Request Block (URB) to receive the DWA TRes (times 302 and 304). The amount of time depends on the wired USB driver and hardware (which a HWA/DWA implementer usually has no control over). It has been measured to be 1 microframe on some systems (about 125 µs).

The DWA driver then does some processing and sends an IN transfer request, which is broken into four HWA messages. The first HWA message informs the HWA to get the data from the DWA. This time (304 thru 306) has been measured to be 1-2 microframes (about 125-250 µs).

The HWA creates an MMC and sends it to the DWA. Once again, depending on the implementation, this can take up to 120 µs.

So, from the time that the DWA is ready to send the data (time 300) until it is sent (time 308) can be in the 600-700 µs range. In some cases, additional delay results if an implementation sends MMCs at a periodic rate, in which case the effective or actual MMC preparation time can be much longer.

However, the WUSB specification states that a device driver is not allowed to retarget an RPIPE unless it is in the idle state. In a traditional approach, the HWA driver has more 'brains' than the HWA and the HWA has no understanding of the different types of messages of data being handled by the HWA and passed to the HWA driver. However, if the HWA were configured to have some intelligence or understanding of the data being handled by it, some processes could be started sooner, rather than blindly passing data up to the HWA driver and waiting for the HWA driver to instruct the HWA to begin transferring some data (e.g., located at or accessible via the DWA). For example, if an HWA knows that a particular RPIPE is targeted to a DWA IN endpoint, it could choose to parse the DWA TRes message in parallel with sending it to the driver and, if the TRes indicates data is available, it could pre-fetch the data to be ready when the driver asks for it. This approach is shown in FIG. 3B.

Figure 3B:
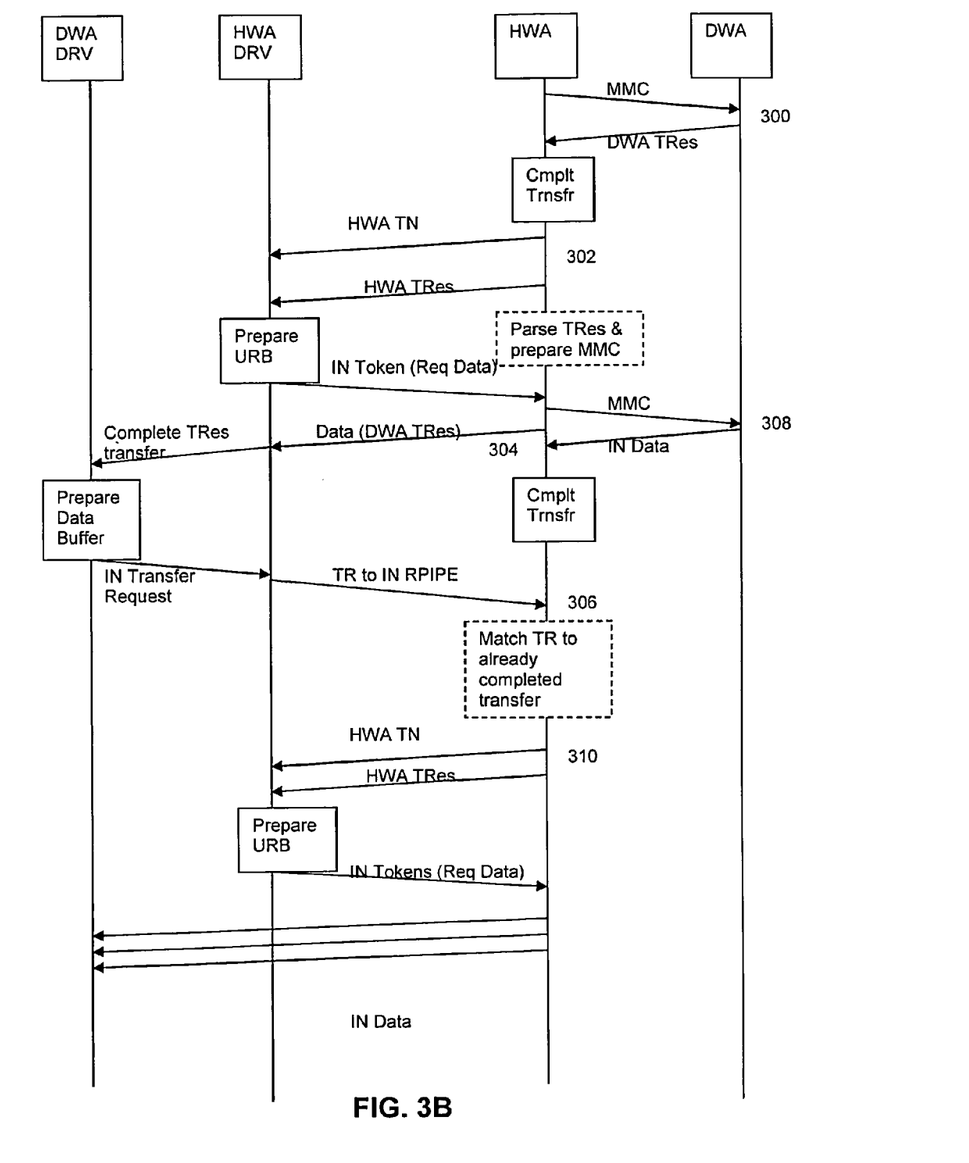
FIG. 3B is a diagram illustrating an embodiment in which a Prepare MMC, send MMC, and receive wireless IN data occur in parallel with driver processing.

FIG. 3B is a diagram illustrating an embodiment in which a Prepare MMC, send MMC, and receive wireless IN data occur in parallel with driver processing. The points in times 300-310 in FIGS. 2 and 3 correspond to the same processing steps but the total amount of time required to complete processing is less in FIG. 3B compared to FIG. 3A. When the Transfer Request to get the IN data arrives (time 306), the HWA checks to see if it is already complete (or possibly underway), and proceeds to complete the transfer much faster.

There some potential issues using this technique. It is possible that at time 306, the driver sends an Abort RPipe request or an Abort Transfer to the DWA RPIPE instead of the IN transfer request. In either case, the driver expects the DWA to send a TRes that indicates an abort occurred, as well as any data already received and then stop the transfer. But in this case, the DWA already sent the data, and it is waiting in the HWA RPIPE. To get around these complications, in some embodiments, the following is performed.

Normally, the HWA would ACK the IN data using the MMC after the one at time 308. In WUSB, the host sends a sequence of MMC packets. If a particular MMC asks for IN data, a later MMC will send the ACK for the data the device tried to send. Oftentimes (but not always), the ACK is in the next MMC after the one that asked for the data. To simplify the abort case, in some embodiments the HWA only ACKs the data after the TR is received at time 306.

While waiting for the IN TR, if a transfer to the HWA RPIPE targeted to the DWA control endpoint is started, in some embodiments the HWA discards the IN Data that it has already received from the DWA (the HWA could parse the control message and check to see if it is an Abort RPipe request, but control transfers are so rare that it is unlikely to be worth the effort). The DWA will be requested at a later time to retransmit the data it has. Since the HWA never ACK'ed the data, the DWA will still have a copy.

While waiting for the IN TR, in some embodiments the HWA monitors transfers to the RPIPE targeted to the DWA BULK OUT endpoint—this is the pipe that would carry an Abort Transfer message. In some cases it probably is worth the effort to parse the messages on the BULK OUT since transfers on this pipe are much more frequent; almost always the request will be a concurrent TR (e.g., see the figure below) rather than an Abort Transfer message). If an Abort Transfer is received, the HWA should discard the data as described above.

For this enhancement to work, the HWA needs to know which RPIPEs are targeted to the DWA endpoints. The specification shows that the RPipe descriptor contains a pointer to a Device Information Buffer. This buffer is settable or otherwise configurable by the device driver; in some embodiment a bit in this structure is used or set by the driver to indicate to the HWA if the device is a DWA or not.

In some embodiments, performance of an HWA-DWA system is improved using partially overlapping transfers. The Wireless USB specification describes a method for controlling several concurrent (or overlapping) transfers using a particular RPIPE. The details of what phases of the transfers can overlap are not specified, other than (1) it is the responsibility of the driver to manage the transfers so that the RPIPEs do not overflow and (2) the sequence of a TRes followed by data for Ins or TR followed by data for OUTs must be adhered to. A traditional approach is to let all signaling or process complete and then the DWA driver knows it is safe to instruct the DWA to begin refilling the DWA RPIPE with new data. However, the DWA RPIPE actually (at least partially) empties before all of the signaling or processing completes. If the DWA driver were able to know earlier than this that the DWA RPIPE is (at least partially) empty and it is okay to begin refilling it, the latency could be reduced and/or data throughput could be increased. The following figures below show some embodiments where a HWA driver is configured to notify a DWA driver the DWA RPIPE is at least partially empty and the DWA driver (in response to the notification from the HWA driver) begins refilling the DWA RPIPE.

Figure 4:
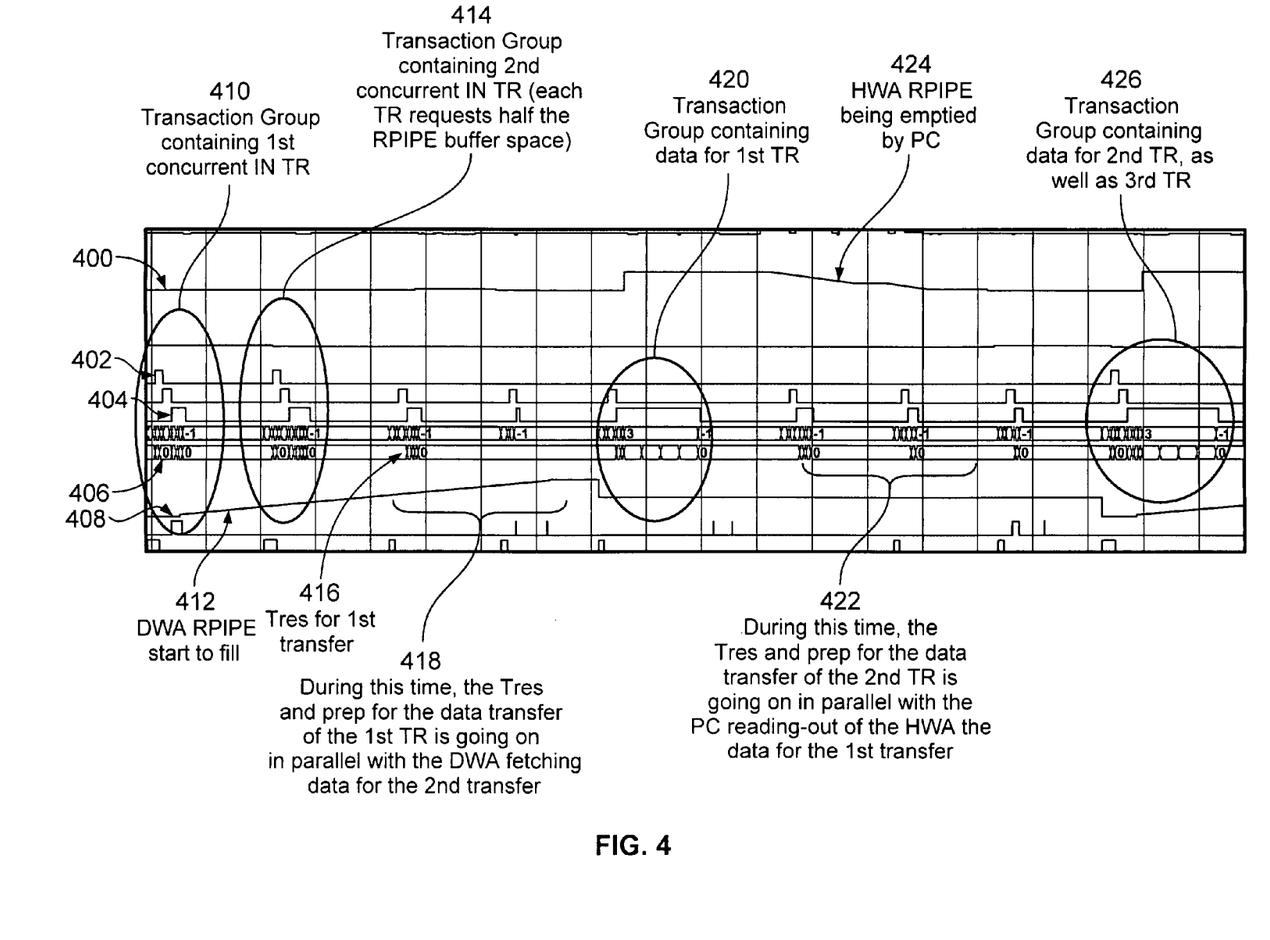
FIG. 4 is a diagram illustrating an embodiment of a fully overlapping transfer.

FIG. 4 is a diagram illustrating an embodiment of a fully overlapping transfer. In the example shown, the top curve (line 400) shows the number of bytes in the HWA RPIPE. The first row of pulses (line 402) indicates when the HWA is sending an OUT packet over the wireless channel. The second row of pulses (line 404) indicates when the HWA is requesting IN data. Waveform 406 shows the size of each wireless packet. Line 408 shows the amount of data in the DWA RPIPE.

A transaction group containing a first concurrent IN TR is shown at 410. At 412, the DWA RPIPE starts to fill. Another transaction group containing a second concurrent IN TR is shown at 414. Each TR requests half of the RPIPE buffer space. At 416, a TRes for the first transfer occurs. During window 418, the TRes and preparation for the data transfer of the first TR occurs in parallel with the DWA fetching data for the second transfer.

At 420, the transaction group containing data for the first TR occurs. During window 422, the TRes and preparation for the data transfer of the second TR occurs in parallel with the PC (or other USB host connected to an HWA) reading the data for the first transfer out of the HWA. At 424, the HWA RPIPE is emptied by the PC. At 426, the transaction group containing data for the second TR as well as the third TR is shown.

One advantage to the above technique is that some of the overhead associated with the 4-message protocol goes on in parallel with another useful data transfer. See, for example, windows 418 and 422. However, each transfer must split or divide the available RPIPE buffer size. For example, in a memory-limited system this can be a problem, especially if more than two concurrent transfers are supported.

Figure 5:
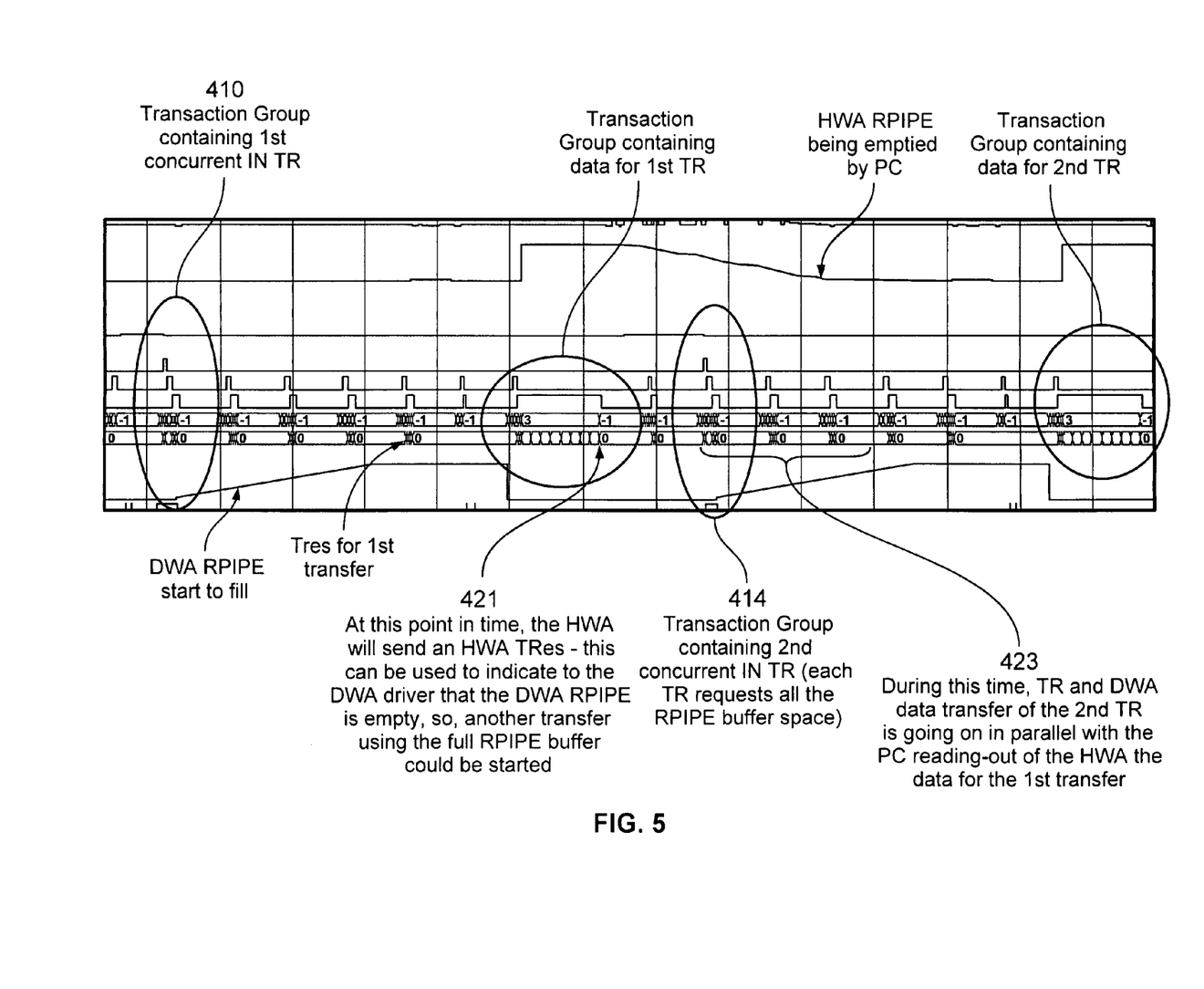
FIG. 5 is a diagram illustrating an embodiment of a partially overlapping transfer where the overlap is scheduled so each transfer has full access to the RPIPE.

FIG. 5 is a diagram illustrating an embodiment of a partially overlapping transfer where the overlap is scheduled so each transfer has full access to the RPIPE. The example system in FIG. 4 was able to support two IN TR at the same time, and so two of the earliest events that occur in FIG. 4 are the transactions groups containing the first and second IN TR, respectively at times 410 and 414. In contrast, this system supports one IN TR at a time, and so the transaction group containing the second IN TR (similarly labeled as time 414) occurs later in FIG. 5 compared to FIG. 4. At time 421, the HWA is sent an HWA TRes which is used in least some embodiments to indicate to the DWA driver that the DWA RIPIE is empty so another transfer using the full RPIPE buffer could be started. In the system of FIG. 5, each TR request has access to the entire RPIPE buffer space and does not share it.

One advantage to using a partially overlapping transfer is that some of the overhead associated with the 4-message protocol occurs in parallel with other useful data transfer (e.g., window 423). Another advantage is that the RPIPE buffer space is not split between the concurrent transfers. However, there is relatively little overlap compared to the fully overlapping transfers, which corresponds to a lower data transfer throughput.

In some embodiments, aspects of the two approaches described above are combined to have the benefits of both. In some embodiments, two fully overlapping transfers and a third partially overlapping transfer is also supported. By doing this, the RPIPE buffer space is only split into two sections (rather than 3—at least in this embodiment), but an additional level of parallelism is achieved. An example of this is described below.

Figure 6:
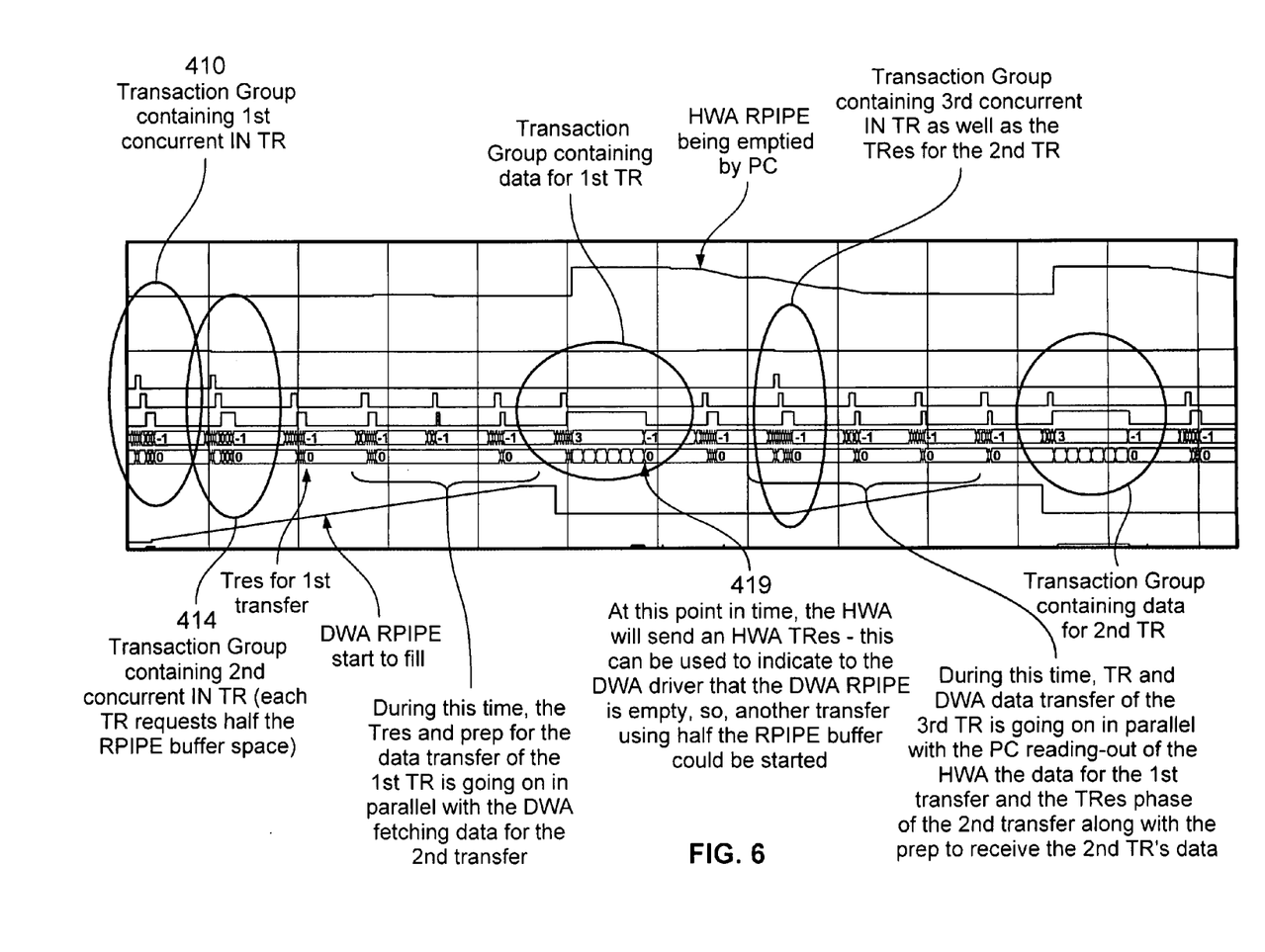
FIG. 6 is a diagram illustrating an embodiment of two fully overlapping transfers and a third partially overlapping transfer.

FIG. 6 is a diagram illustrating an embodiment of two fully overlapping transfers and a third partially overlapping transfer. Simulations for various buffer sizes and transfer processing delays indicate this hybrid approach provides a higher throughput than the strictly fully overlapping and strictly partially overlapping approaches.

In this approach, two fully overlapping transfers are supported. For example, times 410 and 414 show transaction groups for the first and second IN TR, respectively. The two TR requests each have half of the RPIPE buffer space. At 419, the HWA sends an HWA TRes which indicates to the DWA driver that the DWA RPIPE is half empty. This allows the DWA driver to know that the $1^{st}$ half of the DWA RPIPE has been successfully transferred to the HWA side and the DWA driver can instruct or cause another TR to begin refilling the DWA RPIPE. In a traditional system, the DWA driver would wait until the entire process completed. This ensures there is space in the DWA RPIPE, but requires more time than is absolutely necessary. In some embodiments, an existing HWA driver design is modified to be able to instruct to a DWA driver at an appropriate time that the DWA RPIPE is (e.g., half, 1/N, etc.) empty. In some embodiments, an existing DWA driver design is modified to be able to process such a message or indication and triggers refilling a DWA RPIPE in response to the indication.

The complexity of this approach is primarily in the device driver. In some embodiments, the scheduling of the transfer overlaps depends on the number ongoing in the following way: (1) if n overlapping transfers are supported, n−1 will be fully overlapping and 1 will be partially overlapping; (2) if the DWA driver has a buffer it fills from a driver above it and less than n−1 TRs are ongoing, it should start another one immediately; and/or (3) if there are n−1 already ongoing, wait until the next HWA TRes message arrives. This Transfer Result message will tell a DWA driver how much data is in the HWA RPIPE and therefore how much empty space is in the DWA RPIPE. At that point the DWA can start the nth 'partially overlapping' transfer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing data in a Host Wireless Adapter (HWA)-Device Wireless Adapter (DWA) system, comprising:
    receiving at the HWA a wireless packet from the DWA which contains a DWA Transfer Result message;
    wherein the DWA Transfer Result message indicates how much data resides in a DWA Remote Pipe (RPIPE);
    at the HWA, parsing the DWA Transfer Result message;
    in the event parsing the DWA Transfer Result message indicates there is data currently ready to be sent over a wireless channel between the HWA to the DWA:
        generating, at the HWA, a Micro-scheduled Management Command (MMC); and
        transmitting the MMC from the HWA to the DWA, wherein:
            the MMC is transmitted prior to receiving a Transfer Request message at the HWA from an HWA driver and
            in response to receiving the MMC, the data is transmitted from the DWA to the HWA;
    receiving at the HWA the data from the DWA;
    receiving at the HWA the Transfer Request message from the HWA driver; and
    transmitting a Transfer Notification message to a HWA driver in response to receiving the Transfer Request.

2. The method as recited in claim 1 further comprising in the event the data has not completed transmission from the DWA to the HWA when the Transfer Request message is received, waiting for the transmission to complete before transmitting the Transfer Notification message.

3. The method as recited in claim 1, wherein there is a plurality of pieces of data at the HWA and the method further includes matching the received Transfer Request message to one of the plurality of pieces of data.

4. The method as recited in claim 1 further comprising in response to receiving the Transfer Request message from the HWA driver, sending to the DWA an acknowledgement associated with receiving the data.

5. The method as recited in claim 1 further comprising:
    while waiting to receive the Transfer Request message, determining if a transfer to an HWA Remote Pipe (RPIPE) targeting a DWA control endpoint occurs; and
    if so, discarding at the HWA any data received from the DWA.

6. The method as recited in claim 1 further comprising:
    while waiting to receive the Transfer Request message, determining if a transfer to an HWA Remote Pipe (RPIPE) targeting a DWA BULK OUT endpoint includes an Abort Transfer message; and
    if so, discarding at the HWA any data received from the DWA.

7. The method as recited in claim 1, wherein a Device Information buffer is used to indicate to the HWA whether a device is a DWA.

8. The method of claim 1, wherein the DWA Transfer Result message is a Remote Pipe (RPIPE) message in accordance with a standard of a Wireless Universal Serial Bus (USB) family of standards.

9. A system for managing data in a Host Wireless Adapter (HWA)-Device Wireless Adapter (DWA) system, comprising:
    a processor; and
    a memory coupled with the processor, wherein the memory is configured to provide the processor with instructions which when executed cause the processor to:
        receive at the HWA a wireless packet from the DWA which contains a DWA Transfer Result message;
        wherein the DWA Transfer Result message indicates how much data resides in a DWA Remote Pipe (RPIPE);
        at the HWA, parse the DWA Transfer Result message; and
        in the event parsing the DWA Transfer Result message indicates there is data currently ready to be sent over a wireless channel between the HWA to the DWA:
            generate, at the HWA, a Micro-scheduled Management Command (MMC); and
            transmit the MMC from the HWA to the DWA, wherein:
                the MMC is transmitted prior to receiving a Transfer Request
                message at the HWA from an HWA driver; and
                in response to receiving the MMC, the data is transmitted from the DWA to the HWA;
        receive at the HWA the data from the DWA; receive at the HWA the Transfer Request message from the HWA driver; and transmit a Transfer Notification message to a HWA driver in response to receive the Transfer Request.

10. The system of claim 9, wherein the DWA Transfer Result message is a Remote Pipe (RPIPE) message in accordance with a standard of a Wireless Universal Serial Bus (USB) family of standards.

11. A method for accessing data, comprising:
receiving an indication there is a data transfer waiting to be performed associated with a Remote Pipe (RPIPE) of a Wireless Universal Serial Bus (USB) Device Wireless Adapter (DWA);
wherein receiving the indication includes receiving a Transfer Result message from wireless USB HWA and wherein the Transfer Result message indicates how much data resides in the DWA Remote Pipe (RPIPE);
determining if strictly less than a maximum number of overlapping data transfers to the RPIPE of the Wireless USB DWA is being performed;
in the event strictly less than the maximum number of overlapping data transfers is being performed, initiating the data transfer waiting to be performed; and
in the event the maximum number of overlapping data transfers is being performed:
receiving an indication that at least one of the maximum number of overlapping data transfers has completed; and
in response to receiving the indication that at least one of the maximum number of overlapping data transfers has completed, initiating the data transfer waiting to be performed.

12. The method as recited in claim 11, wherein the maximum number of overlapping data transfers is two.

13. The method as recited in claim 11, wherein a first overlapping data transfer is in a Transfer Result period while a second overlapping data transfer is in a Data Fetch period.

14. The method as recited in claim 11, wherein at least two of the following overlap in time:
a USB host retrieves data associated with a first overlapping data transfer from the Wireless USB HWA;
a second overlapping data transfer is in Transfer Result period; and
a third overlapping data transfer is in a Transfer Request phase.

15. The method as recited in claim 14, wherein the USB host includes a personal computer (PC).

* * * * *

UNITED STATES PATENT AND TRADEMARK OFFICE
CERTIFICATE OF CORRECTION

Page 1 of 1

PATENT NO. : 8,904,408 B1
APPLICATION NO. : 12/077527
DATED : December 2, 2014
INVENTOR(S) : Gallagher et al.

It is certified that error appears in the above-identified patent and that said Letters Patent is hereby corrected as shown below:

In the Claims

In column 7, line 66, in Claim 1, after "driver", insert --;--, therefor

In column 8, line 62, in Claim 9, after "Request", delete "¶", therefor

In column 8, line 66, in Claim 9, after "DWA;", insert --¶--, therefor

In column 9, line 1, in Claim 9, after "and", insert --¶--, therefor

In column 9, line 24, in Claim 11, delete "performed:" and insert --performed;--, therefor Signed and Sealed this
Thirtieth Day of June, 2015

Michelle K. Lee
*Director of the United States Patent and Trademark Office*